United States Patent [19]

Gucwa, Jr. et al.

[11] 4,022,598
[45] May 10, 1977

[54] PROTECTION SYSTEM FOR ELECTRIC MOTOR

[75] Inventors: Eugene F. Gucwa, Jr., Cazenovia; Rudy C. Bussjager, Minoa; Arthur C. Grantham, Liverpool, all of N.Y.

[73] Assignee: Carrier Corporation, Syracuse, N.Y.

[22] Filed: Oct. 28, 1975

[21] Appl. No.: 626,605

[52] U.S. Cl. .............................. 62/164; 318/472; 361/29; 361/31
[51] Int. Cl.² ................................. F25D 29/00
[58] Field of Search ............... 62/158, 229, 164; 318/472, 473, 455; 317/13 A, 13 B

[56] References Cited

UNITED STATES PATENTS

| | | | |
|---|---|---|---|
| 3,050,254 | 8/1962 | Blackett | 236/1 |
| 3,259,826 | 7/1966 | Paul | 318/473 X |
| 3,721,866 | 3/1973 | McIntosh | 62/158 X |
| 3,903,456 | 9/1975 | Schaefer | 318/472 |

*Primary Examiner*—William E. Wayner
*Attorney, Agent, or Firm*—J. Raymond Curtin; Barry E. Deutsch

[57] ABSTRACT

A protection system for an electric motor including a safety switch to deenergize the motor upon the occurrence of a potentially deleterious operating condition. The protection system includes a current sensitive device in series with the motor. The device is deenergized when the motor is deenergized due to the occurrence of the deleterious operating condition. The protection system further includes a holding device having a normally closed switch electrically connected thereto. The holding device is energized and its switch is opened when the current sensitive device is energized. The holding device remains energized, even though the current device is deenergized, to prevent the motor from being reenergized. The holding device is deenergized to permit reenergization of the motor by the manual opening of a switch connected in series therewith.

6 Claims, 2 Drawing Figures

PROTECTION SYSTEM FOR ELECTRIC MOTOR

BACKGROUND OF THE INVENTION

This invention relates to a protection system for an electric motor, and in particular, to a system having a fault sensing device directly connected to the motor and having a second device to indirectly sense the opening of the fault sensing device upon the occurrence of a sensed fault.

Air conditioning systems, including mechanical refrigeration units, have grown in importance in maintaining the environment of enclosed areas comfortable for the occupants thereof. Very often, the mechanical refrigeration unit is physically located at a remote distance from the inhabited areas served by the air conditioning system. For example, in shopping malls, very often the refrigeration units are located on the roof of the mall structure. When installed on a roof or similar location, the refrigeration unit is relatively inaccessible and thus operates with minimal amount of human monitoring.

Typically, the mechanical refrigeration unit includes safety controls to deenergize the electric motor employed to drive the compressor upon the occurrence of a fault or detrimental operating condition. For example, if the compressor discharge pressure exceeds a predetermined magnitude, the motor is rendered inoperable. Similarly, the motor is stopped if the temperature of the motor's windings exceeds a predetermined value. Very often, the safety controls are of the type which automatically reset upon the passage of a predetermined time interval. If the fault should reoccur, the safety control will again deenergize the motor. This undesired cyclical operation may occur for a prolonged period of time without detection, whereby eventual damage to the compressor or motor may result.

To prevent the undesirable cyclical operation resulting from an undetected fault, many controls have heretofore included lock-out mechanisms whereby, once a fault occurs and the motor is deenergized, the motor is prevented from being restarted until a reset mechanism is manually actuated. By employing a manual reset device, the operator or maintainer of the air conditioning system is alerted to the potential problem. For convenience purposes it may be desirable to have the reset device located in the occupied areas, remote from the refrigeration unit. The thermostatic switch of the air conditioning system, in combination with a relay, has been employed to obtain the desired reset function. An example of such a control is illustrated in U.S. Pat. No. 3,050,254, issued Aug. 21, 1962. Although, the control disclosed in the aforecited patent illustrates the desired lock-out feature in combination with a manual reset mechanism, the illustrated control is not entirely satisfactory if employed with modern refrigeration equipment.

Typically, a large percentage of present refrigeration equipment employ hermetically sealed motor compressor units. Almost all such motor compressor units have safety devices provided to prevent the continued operation when the temperature of the motor's winding has exceeded a predetermined level. It is desirable that such safety device be mounted in direct contact with the motor's windings and thus be sealed within the same shell as the motor compressor unit. The aforecited patent does not disclose a safety device to directly sense the winding temperature and the deenergize the motor compressor unit upon excessive winding temperature. The high-low pressure cut-off switch therein disclosed is connected in the circuit at a point remote from the motor compressor unit. Unlike the high-low pressure cut-off switch which is employed to open the electrical circuit to the motor and to energize a lock-out device, a safety device to deenergize a hermetically sealed motor upon excessive winding temperature may not feasibly be employed to both deenergize the motor, to actuate a lock-out feature. Thus even if the cut-off switch disclosed in U.S. Pat. No. 3,050,254 were mounted in direct contact with the windings, the control therein disclosed cannot be readily employed to obtain the desired protection, lock-out, and reset functions.

SUMMARY OF THE INVENTION

Accordingly, it is an object of this invention to directly sense excessive motor winding temperature and to deenergize the motor upon the occurrence of same and to prevent the motor from being restarted until a manual reset mechanism is actuated.

It is a further object of the present invention to indirectly sense the opening of a safety switch provided to prevent continued operation of a motor compressor unit upon excessive winding temperature and to lock-out the motor until a manual reset device is actuated.

These and other objects of the present invention are attained in a protection system for an electric motor employed to drive a compressor of a mechanical refrigeration unit with the motor being connected to a source of electrical energy. Fault sensing means are provided in direct contact with the motor to disconnect the motor from the source of electrical energy upon the occurrence of a fault. The protection system further includes means responsive to the flow of electrical energy to the compressor motor. The energy responsive means is placed in a first state when energy is supplied to the motor and is placed in a second state when the supply of electrical energy is discontinued. The protection system further includes lock-out means including holding means operable between first and second states. The holding means is placed in its second state in response to the electrical energy responsive means being placed in its first or energized state. The holding means remains in its second state in response to the electrical responsive means being placed in its second or deenergized state. The holding means remains in its second state when the motor is disconnected from the source of electrical energy by the fault sensing means to prevent the motor from being reconnected to the source of electrical energy even though a requirement for conditioned air is sensed by suitable thermostatic means. The holding means is placed in its first state upon the manual opening of a switch in series therewith whereby the motor is reconnected to the source of electrical energy upon the reclosing of the thermostatic switch means.

DESCRIPTION OF THE PREFERRED EMBODIMENT

Figure 1:
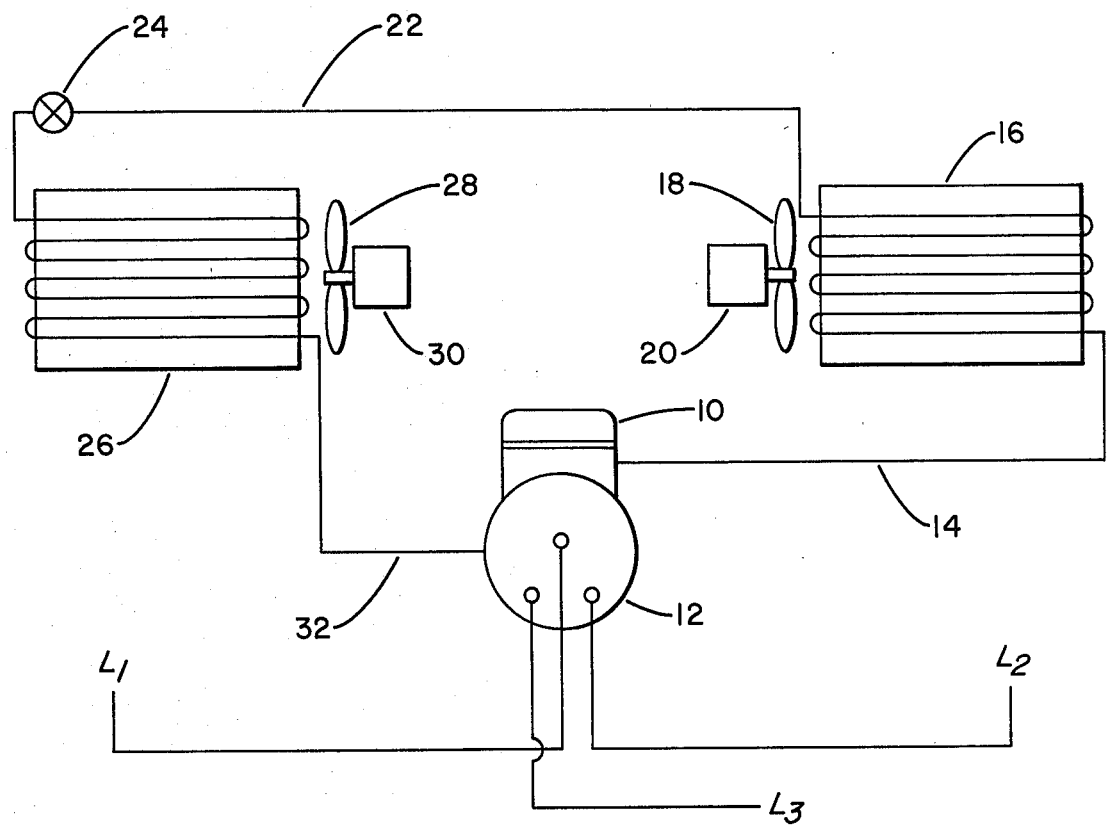
FIG. 1 schematically illustrates a mechanical refrigeration unit including an electric motor having a protection system in accordance with the instant invention.

Referring now to the drawings, there is illustrated a preferred embodiment of the instant invention. In referring to the several figures, like numerals shall refer to like parts.

With reference in particular to FIG. 1, there is disclosed a mechanical refrigeration unit of the type employed in an air conditioning system. The invention herein disclosed is particularly suitable for use with such mechanical refrigeration units; however, the use of the invention with mechanical refrigeration units is not restricted thereto.

The mechanical refrigeration unit includes compressor 10 operatively connected to electric motor 12. Motor 12 receives electrical energy via lines L1, L2 and L3. Although an electrical three phase system is shown, it should be understood, a single phase system may be employed in lieu thereof. Compressor 10 is illustrated as a reciprocating type compressor, but other types of mechanical compressors, such as centrifugal, or screw compressors, may be suitably substituted therefore.

High pressure refrigerant gas is discharged from compressor 10 and is supplied via conduit 14 to a first heat exchanger 16 functioning as a refrigerant condenser. A relatively cold medium, for example ambient air, is passed in heat transfer relation with the vaporous refrigerant flowing through condenser 16. The vaporous refrigerant rejects heat to the cold medium and is condensed thereby. Fan 18, suitably connected to electric motor 20, is provided to route ambient air in heat transfer relation with the vaporous refrigerant.

The condensed refrigerant flows through conduit 22 and expansion device 24 to a second heat exchanger 26 functioning as a refrigerant evaporator. Expansion device 24 is illustrated as a thermal expansion valve; however, other suitable expansion means, for example a capillary tube may be suitably substituted therefore.

Air to be cooled, is routed in heat transfer relation with the refrigerant flowing through evaporator 26. The refrigerant absorbs heat from the air which is then supplied, by suitable means not shown, to the various spaces served by the air conditioning system. A fan 28 suitably connected to electric motor 30 is provided to route the air to be cooled in heat transfer relation with the refrigerant flowing through evaporator 26.

The vaporous refrigerant is returned to the suction side of compressor 10 via line 32. The foregoing illustrates a typical mechanical refrigeration unit of the type well known to those skilled in the art.

The refrigeration unit may be located in a relatively remote or inaccessible area, for example, on the roof of the structure being served by the air conditioning system. When installed in a remote location, it is extremely important that the mechanical refrigeration unit have a protection system which will discontinue operation of the refrigeration unit if faults or other hazardous operating conditions occur.

Excessive motor winding temperature is an example of a hazardous operating condition. Heretofore, many protection systems have utilized a switch disposed directly in contact with the motor windings to protect the windings against excessive temperature. When the temperature of the windings increases above a predetermined level, the switch opens to thereby deenergize the motor. Such a switch, is generally heat responsive, and accordingly, after a lapse of time with the motor in a deenergized state, the windings will cool to a point whereby the switch will close and permit reenergization of the motor. If the hazardously high temperature condition should reoccur, the switch will then reopen. The cyclical operation thus produced may not be detrimental if the refrigeration unit were located in an area monitored by maintenance personnel and such personnel were to observe and recognize the cause of such cyclical operation. However, when the refrigeration unit is located in an inaccessible area, the cyclical operation may not be detected and, after a prolonged period of functioning in such a manner, damage may result to the windings of the motor. Accordingly, it is desirable to prevent reenergization of the motor once the motor has been deenergized due to a faulty operating condition, for example excessive motor winding temperature.

Figure 2:
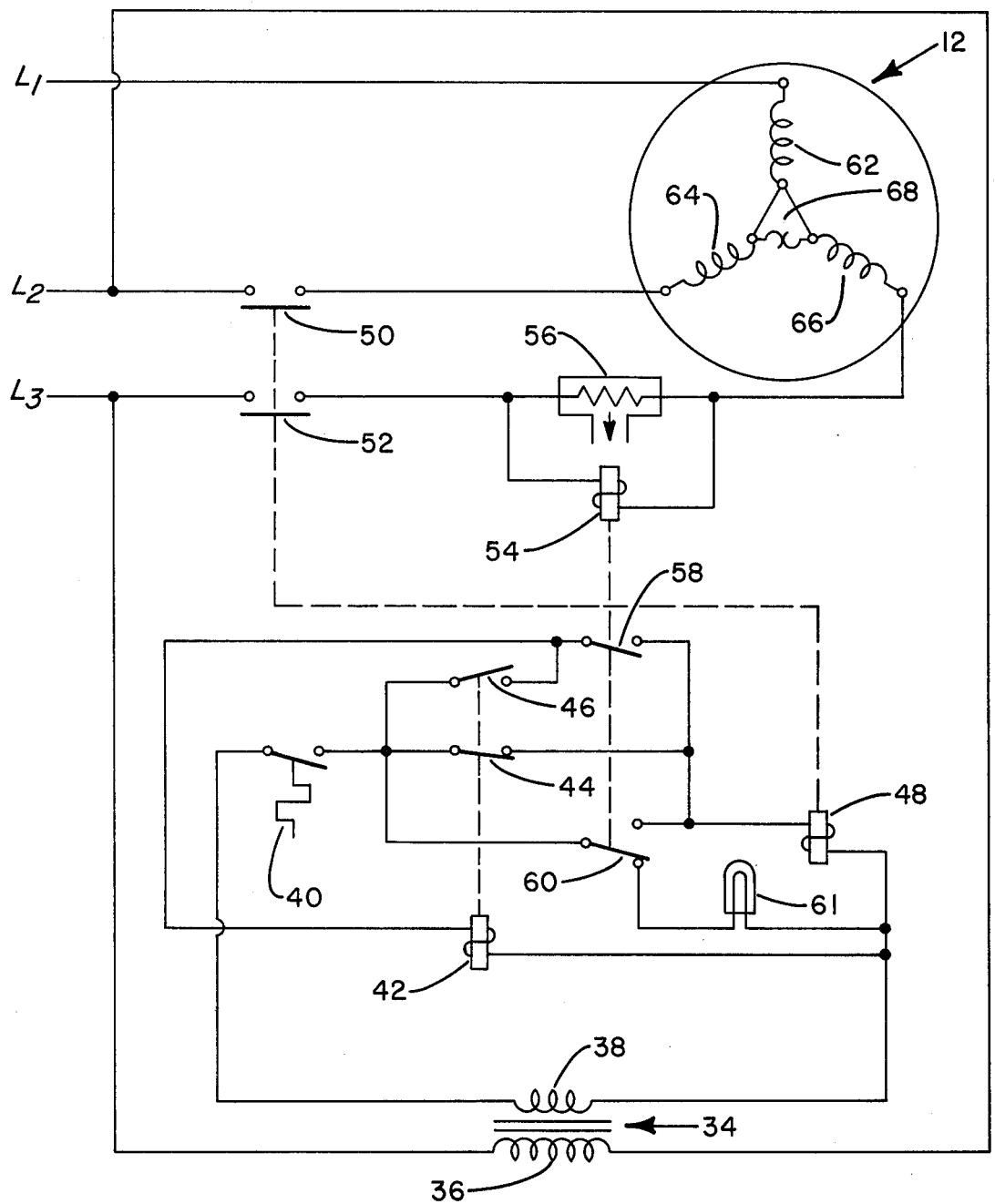
FIG. 2 schematically illustrates an electric motor protection system of the instant invention.

With particular reference to FIG. 2, there is disclosed a protection system which provides the foregoing desired feature and in addition, is particularly suitable for use with hermetically sealed motor compressor units.

Motor 12 includes windings 62, 64 and 66. A normally closed switch 68 is provided in direct contact with at least one of the windings to monitor the temperature thereof and/or the current therethrough. Switch 68 will open when the temperature of the windings and/or the current within rises above a predetermined level.

The protection system includes transformer 34 having primary winding 36 and secondary winding 38. Thermostat 40 is connected in series with secondary winding 38. A first relay 48 is connected in series with thermostat 40. A normally closed switch 44 is connected in series between thermostat 40 and relay 48. In addition, a normally open switch 60 provides a parallel circuit about switch 44. Switch 60 is in series with thermostat 40, relay 48, and indicating light 61. The energization of relay 48 closes normally open switches 50 and 52. Switches 50 and 52 are in series with motor windings 64 and 66. The closure of the switches energizes the windings to start motor 12. A current sensitive device 56 including a relay 54 is provided in series with one of the windings, for example winding 66. The current sensitive device is disposed on the outside of the shell of the hermetic motor compressor unit. With current flowing to winding 66, relay 54 is energized thereby closing normally open switches 58 and 60. The closure of switch 58 causes a relay 42 to be energized. Relay 42 controls the position of normally closed switch 44 and a normally open switch 46. The energization of the relay opens switch 44 and closes switch 46.

OPERATION

Assume power is available via lines L1, L2 and L3 to electric motor 12, and thermostatic switch 40 is in its open position as illustrated in FIG. 2.

When switch 40 senses that the temperature level of the space being served by the air conditioning system has increased beyond a predetermined level, the switch closes a energizes relay 48 through normally closed switch 44. The energization of relay 48 results in switches 50 and 52 closing to thereby provide electrical energy to motor 12. Assuming normal operating conditions, switch 68 is in its closed position. With current flowing to winding 66, current sensitive device 56 is operative and relay 54 is energized. The energization of the relay results in the closing of normally open switches 58 and 60. The closure of switch 60 provides a shunt about normally closed switch 44 for a reason to be explained more fully hereinafter. Closure of switch 58 results in the energization of relay 42. The energization of relay 42 causes switch 44 to open and switch 46 to close. The opening of switch 44 however, does not result in the deenergization of relay 48 since switch 60 has already been closed as a result of the energization of relay 54. The closure of switch 46 provides a parallel path to maintain relay 42 energized even if switch 58 opens.

Now assume an excessive winding temperature is sensed by switch 68. The switch opens to thereby discontinue the flow of current to windings 62, 64 and 66 of motor 12. The opening of switch 68 results in the deenergization of current sensitive relay 54. The deenergization of relay 54 causes switches 58 and 60 to return to their normally open position. The opening of switch 60 causes relay 48 to be deenergized thereby opening switches 50 and 52. The opening of switch 58, however does not have any effect on the continued energization of relay 42 since, switch 46 is in its closed position. With switch 46 closed, relay 42 remains energized irrespective of the opening of switch 58. The continued energization of relay 42 results in the continued opening of switch 44. However, even with switch 40 remaining closed due to the continued demand for cooled air, motor 12 may not be restarted.

As noted before, with switch 46 in its closed position relay 42 remains energized. With both switches 44 and 60 in their open positions, relay 48 cannot be reenergized and thus, switches 50 and 52 remain open. Thus, even if switch 68 were to reclose due to the lowered temperature of the windings due to their deenergization, motor 12 will not restart. Relay 42 will remain energized to lock-out motor 12 until thermostatic switch 40 is opened. Assuming that there is a continuing demand for relatively cold air from the air conditioning system, switch 40 will not open until manually moved to its open position. By requiring that switch 40 be manually opened to permit reenergization of the motor, maintenance personnel are alerted to the possibility of a problem. Should switch 68 again open, such maintenance personnel must again manually reopen switch 40 to permit the reenergization of the motor. If desired, indicating light 61 may be provided. Light 61 will be actuated when switch 60 is in its open state and switch 40 is closed. Thus, light 61 will indicate to maintenance personnel that the compressor is in its locked out state due to the occurrence of a fault.

By providing a current sensitive device 56 including relay 54 externally of the hermetically sealed motor compressor unit, indirect sensing of the opening of switch 68 may be obtained. This permits switch 68 to be in direct contact with the motor windings to insure rapid response if the temperature of such windings increases above a predetermined safe level. The combination of directly sensing excessive motor temperature plus the indirect sensing of the opening of fault sensing switch 68 via current sensitive means 56 results in an effective motor protection system. The foregoing combination in addition to the lockout and reset function obtained by the thermostat in combination with the various relays insures that maintenance personnel are alerted to potential problems. It should be understood, the various relays and switches may be replaced by suitable solid state devices without departing from the spirit of the invention.

While a preferred embodiment of the instant invention has been described and illustrated, the invention should not be limited thereto, but may be otherwise embodied within the scope of the following claims.

We claim:

1. A protection system for an electrical motor employed to drive a compressor of a mechanical refrigeration unit used in an air conditioning system comprising:
 a source of electrical energy;
 thermostatic switch means to connect said electrical motor to said source of electrical energy in response to a sensed temperature level in a space served by the air conditioning system;
 fault sensing means in direct contact with said motor to disconnect said motor from said source of electrical energy upon the occurrence of a fault in said motor;
 current sensitive means electrically connected to said motor and being in a first state when the motor is connected to said source of electrical energy, and a second state when the motor is disconnected from said source of electrical energy;
 lockout means including holding means operable between first and second states, with said holding means being placed in its second state in response to the current sensitive means being placed in its first state, said holding means remaining in its second state when the motor is disconnected from said source of electrical energy by said fault sensing means to prevent said motor from being reconnected to said source of electrical energy even though said thermostatic switch means senses a requirement for conditioned air, said holding means being placed in its first state upon the opening of said thermostatic switch means whereby the motor is reconnected to said source of electrical energy upon the reclosing of said thermostatic switch means; and
 said holding means further including an electrical relay and a normally closed switch operably connected thereto, said energization of said relay causing said switch to open to prevent the motor from being reconnected to said source of electrical energy until said switch recloses upon the deenergization of said electrical relay.

2. A protection system in accordance with claim 1 wherein said compressor and said motor are hermetically sealed within an outer shell, said fault sensing means being located within said shell and said current sensing means being located external of said shell.

3. A protection system in accordance with claim 1 further including indicating means to indicate that said motor is disconnected from said source of electrical energy by said fault sensing means.

4. A protection system for an electrical motor used in an air conditioning system including:
 a thermostatic switch being arranged to close when conditioned air is required in the region serviced by the air conditioning system;
 motor starting circuit means energized by the closure of said thermostatic switch to close a motor starting switch whereby the motor is connected to a source of electrical energy;
 fault sensing means operatively associated with the motor to independently disconnect the motor from said source of energy when a fault condition is sensed;

a current sensing means electrically connected to the motor and being arranged to be placed in a first condition when current is flowing between a source of energy and the motor and in a second condition when current ceases to flow between said source and said motor; and lockout means interposed between the thermostatic switch and said motor starting circuit means, the lockout means being responsive to the current sensing means to hold said motor starting circuit energized when the current sensing means is placed in a first condition and to immediately deenergize the starting circuit when the current sensing means is placed in a second condition, the lockout means further including an electrical relay and switch means responsive thereto being arranged to hold the motor starting circuit deenergized until such time as the thermostatic switch is opened.

5. The protection system of claim 4 further including an indicating means arranged to be activated when the thermostatic switch is closed and the current sensing means is placed in said second state.

6. The protection system of claim 5 wherein said indicating means is a warning light.

* * * * *

UNITED STATES PATENT AND TRADEMARK OFFICE
CERTIFICATE OF CORRECTION

PATENT NO. : 4,022,598

DATED : May 10, 1977

INVENTOR(S) : EUGENE F. GUCWA, JR., RUDY C. BUSSJAGER, ARTHUR C. GRANTHAM

It is certified that error appears in the above-identified patent and that said Letters Patent are hereby corrected as shown below:

At column 4, line 36 change "normally open" to --two position--; column 4 line, 38 change ", relay 48, and" to --and either relay 48 or--; column 4, line 48 and column 5, line 1 change "switches 58 and" to --switch 58 and repositioning switch--.

At column 5, line 1 change "closure" to --repositioning--; column 5, line 8 change "closed" to --repositioned--; column 5 rewrite line 18 as --return to their normal positons. The repositioning of--; column 5 rewrite lines 30 and 31 as --relay 42 remains energized. With switch 44 in its open position and switch 60 in its illustrated position, relay 48 cannot be reener- --; column 5, line 47 change "open state" to --illustrated position--.

Signed and Sealed this

Twenty-ninth Day of July 1980

[SEAL]

Attest:

SIDNEY A. DIAMOND

Attesting Officer

Commissioner of Patents and Trademarks